US012774103B2

(12) United States Patent
Gueneau et al.

(10) Patent No.: US 12,774,103 B2
(45) Date of Patent: Oct. 27, 2026

(54) ASSEMBLY FOR AN AIRCRAFT HAVING MEANS FOR FASTENING A WING TO AN ENGINE PYLON

(71) Applicant: Airbus Operations SAS, Toulouse (FR)

(72) Inventors: Germain Gueneau, Toulouse (FR); Pierre-Antoine Combes, Toulouse (FR); Marc De Nicola, Toulouse (FR)

(73) Assignee: Airbus Operations SAS, Toulouse (FR)

(*) Notice: Subject to any disclaimer, the term of this patent is extended or adjusted under 35 U.S.C. 154(b) by 0 days.

(21) Appl. No.: 19/360,201

(22) Filed: Oct. 16, 2025

(65) Prior Publication Data

US 2026/0109465 A1 Apr. 23, 2026

(30) Foreign Application Priority Data

Oct. 18, 2024 (FR) ...................................... 2411339

(51) Int. Cl.
*B64D 27/40* (2024.01)
*B64D 27/18* (2006.01)

(52) U.S. Cl.
CPC ........... *B64D 27/402* (2024.01); *B64D 27/18* (2013.01)

(58) Field of Classification Search
CPC ........ B64D 27/402; B64D 27/18; B64C 3/185
See application file for complete search history.

(56) References Cited

U.S. PATENT DOCUMENTS

| | | | | |
|---|---|---|---|---|
| 2005/0082423 A1* | 4/2005 | Whitmer | B64D 27/18 244/54 |
| 2016/0221682 A1 | 8/2016 | Pautis et al. | |
| 2020/0298986 A1* | 9/2020 | Cayssials | B64D 27/404 |
| 2024/0150028 A1 | 5/2024 | Pautis et al. | |

FOREIGN PATENT DOCUMENTS

| | | | |
|---|---|---|---|
| EP | 4368512 A1 * | 5/2024 | B64D 27/40 |
| FR | 3135450 A1 * | 11/2023 | B64D 27/406 |

OTHER PUBLICATIONS

French Search Report for corresponding French Patent Application No. 2411339 dated Apr. 8, 2025.

* cited by examiner

*Primary Examiner* — Valentina Xavier
(74) *Attorney, Agent, or Firm* — Greer, Burns & Crain, Ltd.

(57) ABSTRACT

An assembly for an aircraft having an upper fitting fastened to a structure of the wing of the aircraft, a lower fitting fastened to a pressure-side panel of the wing, an engine pylon with two lateral panels mounted so as to articulate on the lower fitting, a starboard-side link rod and a port-side link rod mounted so as to articulate between the lateral panel that is on the same side and the upper fitting, and a stud having a proximal end secured to a rear rib of the engine pylon and a distal end mounted in an aperture of the lower fitting through an annular linear connection.

9 Claims, 5 Drawing Sheets

ASSEMBLY FOR AN AIRCRAFT HAVING MEANS FOR FASTENING A WING TO AN ENGINE PYLON

CROSS-REFERENCES TO RELATED APPLICATIONS

This application claims the benefit of French Patent Application Number FR2411339 filed on Oct. 18, 2024, the entire disclosure of which is incorporated herein by way of reference.

FIELD OF THE INVENTION

The present invention relates to an assembly for an aircraft having means for fastening a wing to an engine pylon, and to an aircraft having a wing and such an assembly.

BACKGROUND OF THE INVENTION

Usually, for an aircraft, a propulsion assembly has a jet engine that is fastened beneath a wing of the aircraft with the aid of an engine pylon. The engine pylon is generally made up of a primary structure formed of a box made up of an upper spar, a lower spar and two lateral panels connecting the two spars, and internal ribs distributed along the box.

The jet engine is fastened beneath the engine pylon by means of engine attachments that conventionally comprise, at the front, a front engine attachment, at the rear, a rear engine attachment, and, between the front and rear engine attachments, an assembly for reacting thrust force comprising reaction link rods, which are fastened both to the jet engine and to a shoe secured to the primary structure of the pylon, for absorbing the thrust forces generated by the jet engine.

A fastening system connects the engine pylon to the wing. This fastening system reacts and absorbs the bending moments and the shear loads at the interface of the engine pylon with the wing. An example of such an arrangement is described in document US-A-2016/0221682.

Although such fastening systems are satisfactory, it is desirable to find different arrangements, in particular in order to limit the occurrence of out-of-plane forces in the engine pylon and to widen the surface area for transferring forces towards the structure of the wing.

SUMMARY OF THE INVENTION

An object of the present invention is to propose an assembly for an aircraft having means for fastening a wing to an engine pylon, wherein the fastening means limit the occurrence of out-of-plane forces in the engine pylon and widen the surface area for transferring forces towards the structure of the wing.

To this end, an assembly for an aircraft is proposed, having a wing with a structure and a pressure-side panel, said assembly having a longitudinal direction and a vertical median plane and having:

- an upper fitting intended to be fastened to the structure of the wing,
- a lower fitting intended to be fastened to the pressure-side panel,
- an engine pylon having a primary structure forming a box and having a starboard-side lateral panel, a port-side lateral panel and a rear rib, which closes the box at the rear, wherein each lateral panel is mounted so as to articulate on the lower fitting,
- a starboard-side link rod and a port-side link rod, wherein a first end of each link rod is mounted so as to articulate on the lateral panel that is on the same side and wherein a second end of each link rod is mounted so as to articulate on the upper fitting, and
- a stud with an axis parallel to the longitudinal direction and having a proximal end secured to the rear rib and a distal end mounted in an aperture of the lower fitting through an annular linear connection.

Such an assembly limits the occurrence of out-of-plane forces.

Advantageously, the stud can move in translation with respect to the lower fitting parallel to a vertical direction.

Advantageously, the assembly has a ring, which has a spherical outer surface and is fitted onto the distal end of the stud, a nut, which has a spherical inner surface in which the ring is housed, wherein, on either side of the nut, the outer surface of the nut has a rib parallel to the vertical direction, wherein, on the edges of the aperture, the lower fitting has, for each rib, a recess extending parallel to the vertical direction in which said rib is guided in translation.

Advantageously, the stud consists of two half-cylinders joined together along a plane, wherein the proximal end of each half-cylinder is fastened to the rear rib.

Advantageously, the two second ends of the link rods are mounted so as to articulate about the same articulation shaft.

Advantageously, said articulation shaft consists of a peripheral shaft, which is cylindrical and hollow, and of an inner shaft, which is fitted into the peripheral shaft.

According to one particular embodiment, the lower fitting consists of a port-side component and a starboard-side component, which are fastened to one another along the vertical median plane, and wherein each component is fastened to the lateral panel that is on the same side and to the pressure-side panel.

According to one particular embodiment, the lower fitting consists of a lower port-side component, a lower starboard-side component, an upper port-side component and an upper starboard-side component, wherein the starboard-side components are fastened to one another, wherein the port-side components are fastened to one another, wherein the starboard-side components and the port-side components are fastened to one another along the vertical median plane, wherein each lower component is fastened to the lateral panel that is on the same side and wherein each upper component is fastened to the pressure-side panel.

The invention also proposes an aircraft having a wing with a structure and a pressure-side panel, a jet engine and an assembly according to one of the preceding variants, wherein the upper fitting is fastened to the structure of the wing, wherein the lower fitting is fastened to the pressure-side panel and wherein the jet engine is fastened beneath the engine pylon.

BRIEF DESCRIPTION OF THE DRAWINGS

The abovementioned features of the invention, along with others, will become more clearly apparent upon reading the following description of an exemplary embodiment, said description being given with reference to the appended drawings, in which.

DETAILED DESCRIPTION OF THE PREFERRED EMBODIMENTS

Figure 1:
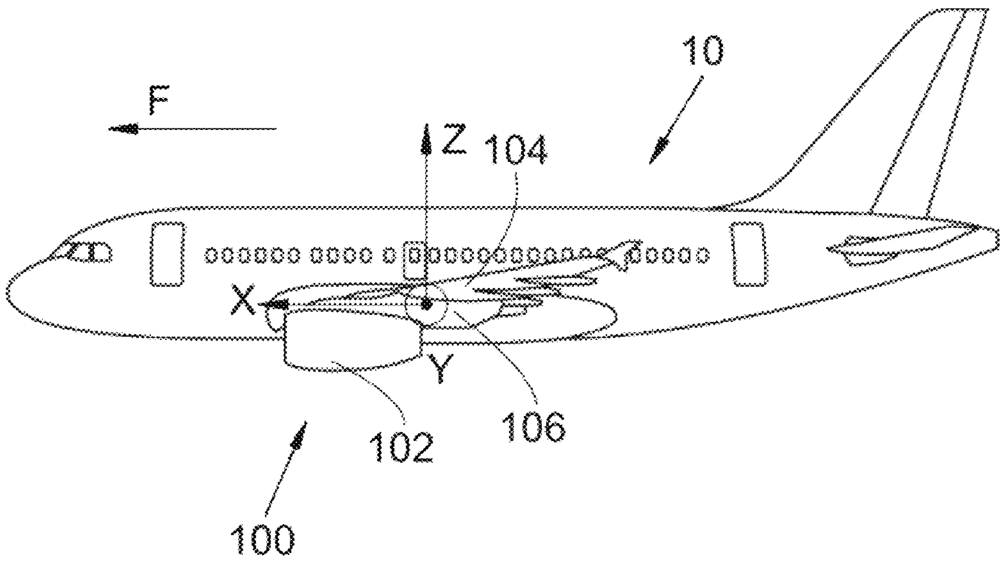
FIG. 1 is a side view of an aircraft according to the invention.

FIG. 1 shows an aircraft 10, which has a propulsion system 100 with a jet engine 102 connected to a wing 104 of the aircraft 10 by way of an engine pylon 106. The engine pylon 106 and the fastening means described below that fasten the engine pylon 106 to the wing 104 form an assembly according to the invention. The jet engine 102 is fastened beneath the engine pylon 106.

In the following description, terms relating to a position are considered in relation to an aircraft in a normal flight position, i.e. as shown in FIG. 1, and the “front” and “rear” positions are considered relative to the front and the rear of the jet engine and relative to the direction of forward movement F of the aircraft 10 when the jet engine 102 is in operation.

In the following description, and by convention, the X direction is the longitudinal direction of the assembly, which is parallel to the longitudinal axis of the jet engine, the Y direction is the transverse direction, which is horizontal when the aircraft is on the ground, and the Z direction is the vertical direction, which is vertical when the aircraft is on the ground, these three directions X, Y and Z being mutually orthogonal.

The jet engine 102 has a shape exhibiting symmetry of revolution about its longitudinal axis.

Figure 2:
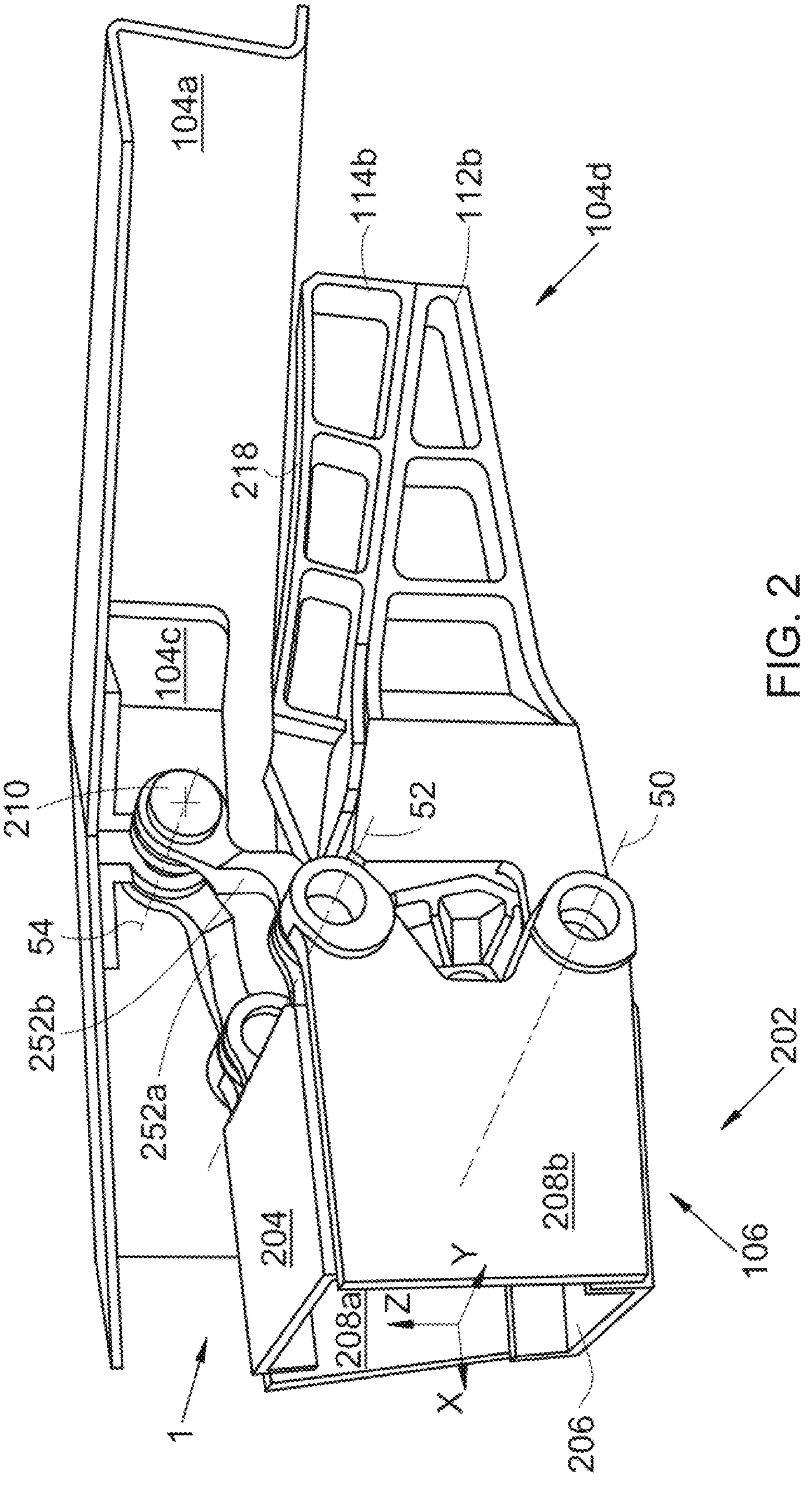
FIG. 2 is a perspective side view of an assembly according to the invention.
Figure 3:
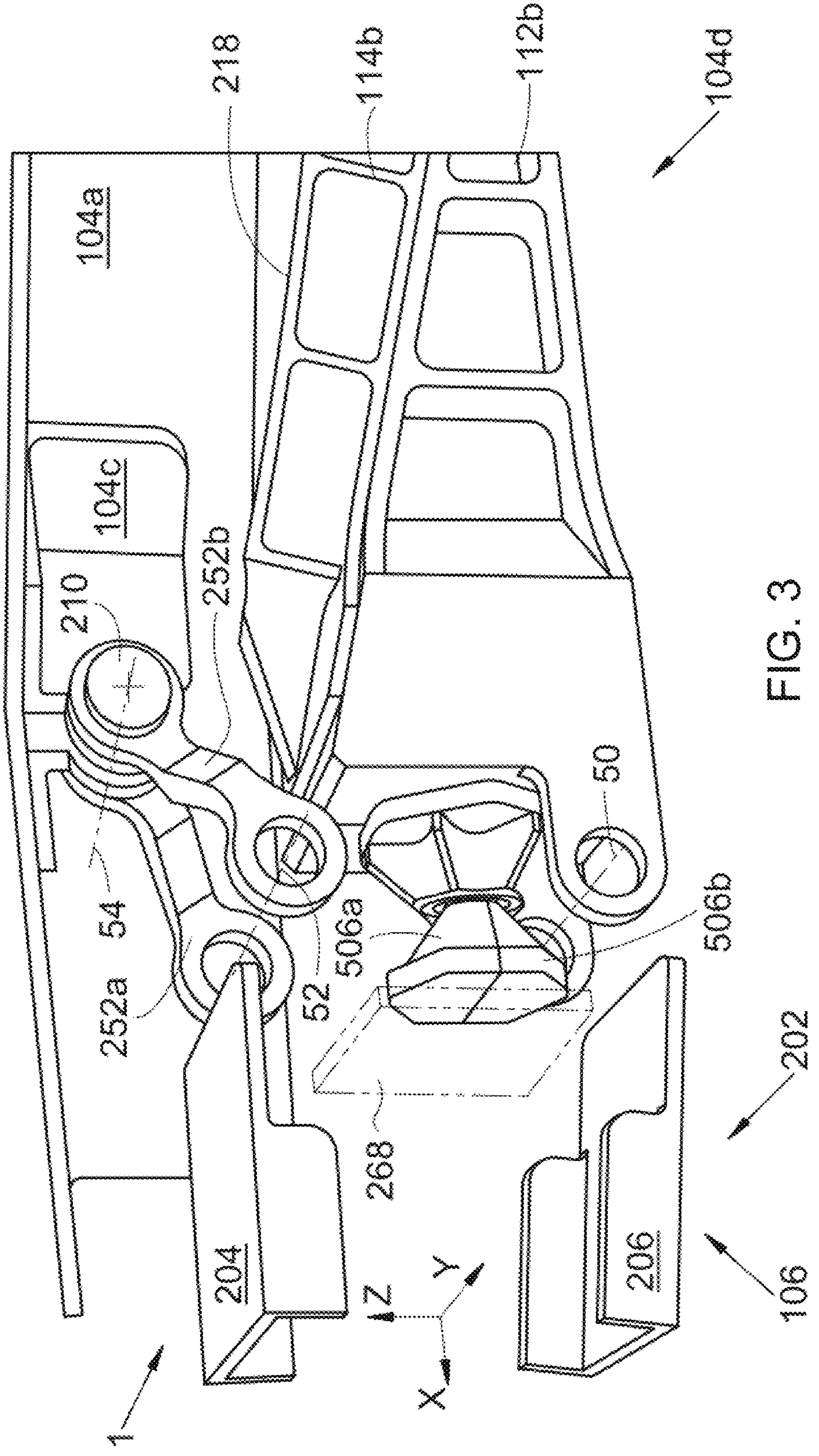
FIG. 3 is a perspective side view of the assembly according to the invention.

As shown in FIG. 2 and FIG. 3, the wing 104 has a structure 104*a* that is rigid and in this case takes the form of spars extending along the transverse direction Y. The wing 104 also has a pressure-side panel (104*b*, FIG. 7), which at least partially covers the lower part of the structure 104*a*. Conventionally, the wing 104 also has a suction-side panel, which at least partially covers the upper part of the structure 104*a*.

The assembly 1 also has an upper fitting 104*c*, which is fastened to the structure 104*a* of the wing 104, and a lower fitting 104*d*, which is fastened to the pressure-side panel 104*b* and more particularly beneath the pressure-side panel 104*b*. These fastenings are ensured by any appropriate means such as bolts, spot welds, etc.

In particular, the fastenings of the lower fitting 104*d* to the pressure-side panel 104*b* ensure that forces are transferred in the X, Y and Z directions.

The upper fitting 104*c* takes the form of a corner fastened to a spar of the structure 104*a* of the wing 104 and more particularly to the front spar.

Figure 7:
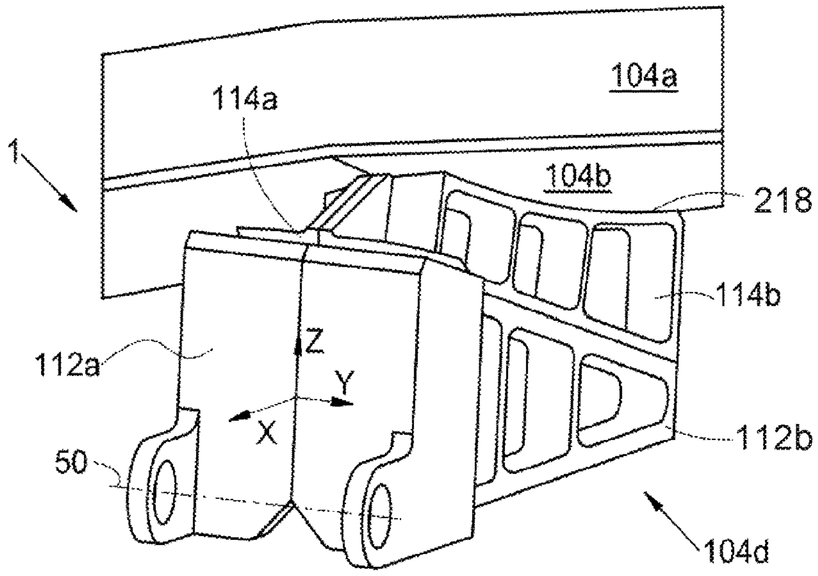
FIG. 7 is a perspective front view of part of the assembly according to the invention.

The lower fitting 104*d* takes the form of a beam that extends along the longitudinal direction X and, as shown in FIG. 7, it has an arcuate upper face 218 so as to best conform to the shape of the pressure-side panel 104*b*.

The upper fitting 104*c* is above the lower fitting 104*d*.

The engine pylon 106 comprises a rigid structure 202 forming a box, also called the primary structure. The primary structure 202 is formed of an upper spar 204, a lower spar 206 and a starboard-side lateral panel 208*a* and a port-side lateral panel 208*b* connecting the two spars 204 and 206. The primary structure 202 can also have internal ribs distributed inside the primary structure 202 and connected to the spars 204 and 206 and to the lateral panels 208*a-b*. The primary structure 202 also has a rear rib 268, which closes the box at the rear and is generally perpendicular to the longitudinal direction X.

The primary structure 202 is generally symmetrical with respect to a median plane XZ of the assembly 1 that extends vertically.

The primary structure 202 supports the jet engine 102 by way of engine attachments that can be of conventional design, such as those disclosed in document US-A-2016/0221682.

The fastening, in series, of the jet engine 102 to the engine pylon 106 and then to the structure 104*a* of the wing 104 ensures that forces are transferred from the jet engine 102 to the wing 104.

The fastening of the engine pylon 106 to the wing 104 is ensured, inter alia, by the fact that each lateral panel 208*a-b* is mounted so as to articulate on the lower fitting 104*d*. Each of the two articulations in this case takes the form of a rotation about the same first articulation axis 50, which is perpendicular to the vertical median plane XZ and therefore parallel to the transverse direction Y. These articulations ensure that forces are transferred in the Z and X directions.

Each articulation of a lateral panel 208*a-b* to the lower fitting 104*d* is formed in this case by a lower shaft (not shown) that passes through a bore in said lateral panel 208*a-b* and a bore in the lower fitting 104*d*. There are thus two lower shafts arranged on either side of the vertical median plane XZ and these two articulations are mutually redundant, i.e. if one of them fails, the force path passes through the other.

The fastening of the engine pylon 106 to the wing 104 is also ensured by a starboard-side link rod 252*a* and a port-side link rod 252*b*, which are also arranged on either side of the vertical median plane XZ. A first end of each link rod 252*a-b* is mounted so as to articulate on the lateral panel 208*a-b* that is on the same side and a second end of each link rod 252*a-b* is mounted so as to articulate on the upper fitting 104*c*. Each articulation of the two first ends in this case takes the form of a rotation about the same second articulation axis 52, which is perpendicular to the vertical median plane XZ and therefore parallel to the transverse direction Y. Each articulation of the two second ends in this case takes the form of a rotation about the same third articulation axis 54, which is perpendicular to the vertical median plane XZ and therefore parallel to the transverse direction Y.

These articulations ensure that forces are transferred in the Z and X directions.

Each articulation of a first end to the lateral panel 208*a-b* is formed in this case by an upper shaft (not shown) that passes through a bore in said first end and a bore in said lateral panel 208*a-b*. There are thus two upper shafts arranged on either side of the vertical median plane XZ and these two articulations are mutually redundant, i.e., if one of them fails, the force path passes through the other.

In this case, each first end forms a female clevis into which a male clevis of the lateral panel 208*a-b* in question is fitted.

Each articulation of a second end to the upper fitting 104*c* is formed in this case by an articulation shaft 210 that passes through a bore in said second end and a bore in the upper fitting 104*c*. In the embodiment of the invention presented here, there is one single articulation shaft 210 for the two second ends of the link rods 252*a-b*.

For reasons of redundancy, the articulation shaft 210 may consist of a peripheral shaft, which is cylindrical and hollow, and of an inner shaft, which is fitted into the peripheral shaft. Thus, in the event of failure of the peripheral shaft, the inner shaft can take over.

The fastening of the engine pylon 106 to the wing 104 is also ensured by a stud 502 (FIGS. 4 and 5) in the form of a straight cylinder, the axis of which is parallel to the longitudinal direction X. The stud 502 has a proximal end secured to the rear rib 268 and a distal end mounted in an aperture 601 of the lower fitting 104*d* through an annular linear connection 504, i.e., the stud 502 is mounted in the aperture 601 through a ball-joint connection and the stud 502 can also move in translation with respect to the lower fitting 104*d* parallel to the longitudinal direction X.

The stud 502 projects towards the rear from the rear rib 268. Such an arrangement limits the occurrence of out-of-plane forces in the engine pylon and widens the surface area for transferring forces towards the structure of the wing.

According to one particular arrangement, the stud 502 can also move in translation with respect to the lower fitting 104*d* parallel to a vertical direction Z. This arrangement ensures that forces are transferred in the Y direction but avoids forces being absorbed in the Z direction, thereby limiting unnecessary static indeterminacy and the occurrence of moments.

Figure 4:
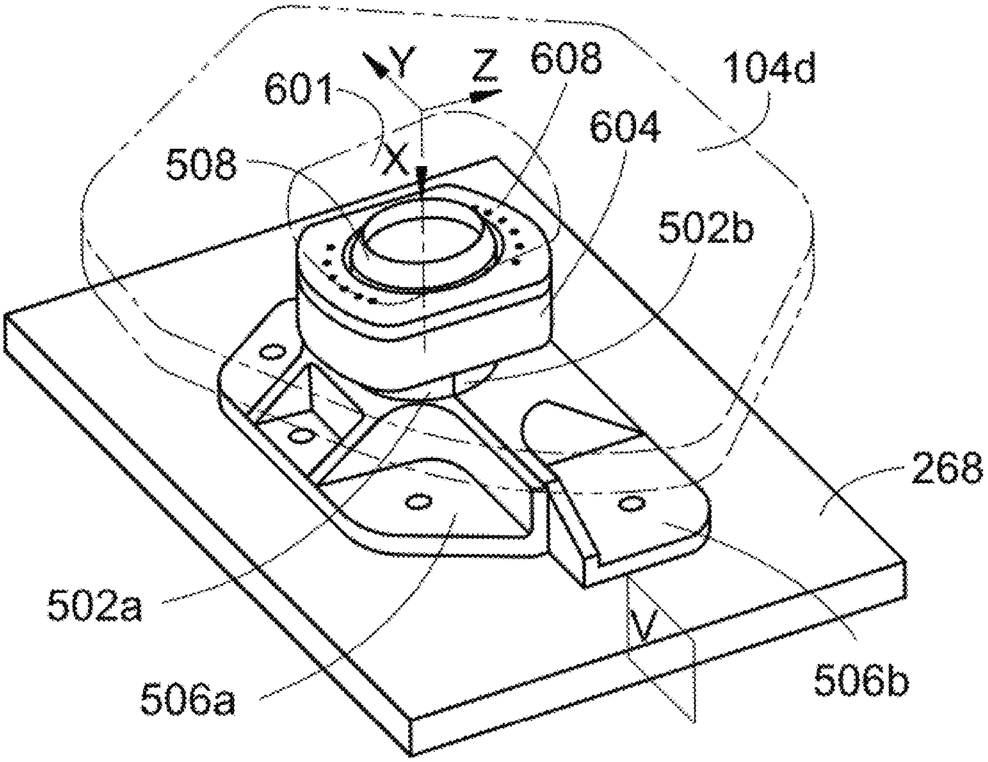
FIG. 4 is a perspective view of an embodiment detail of the assembly according to the invention.
Figure 5:
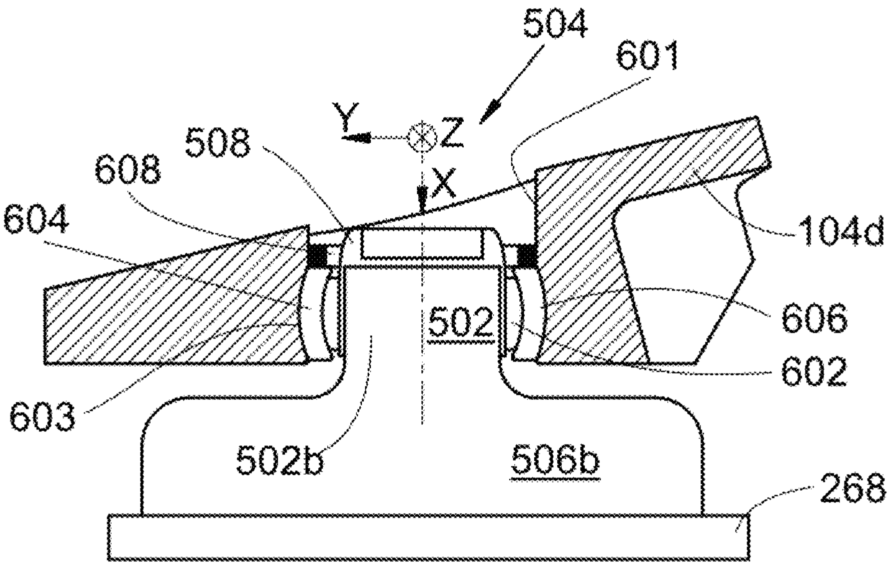
FIG. 5 shows the detail in FIG. 4 as seen in section along plane V.
Figure 6:
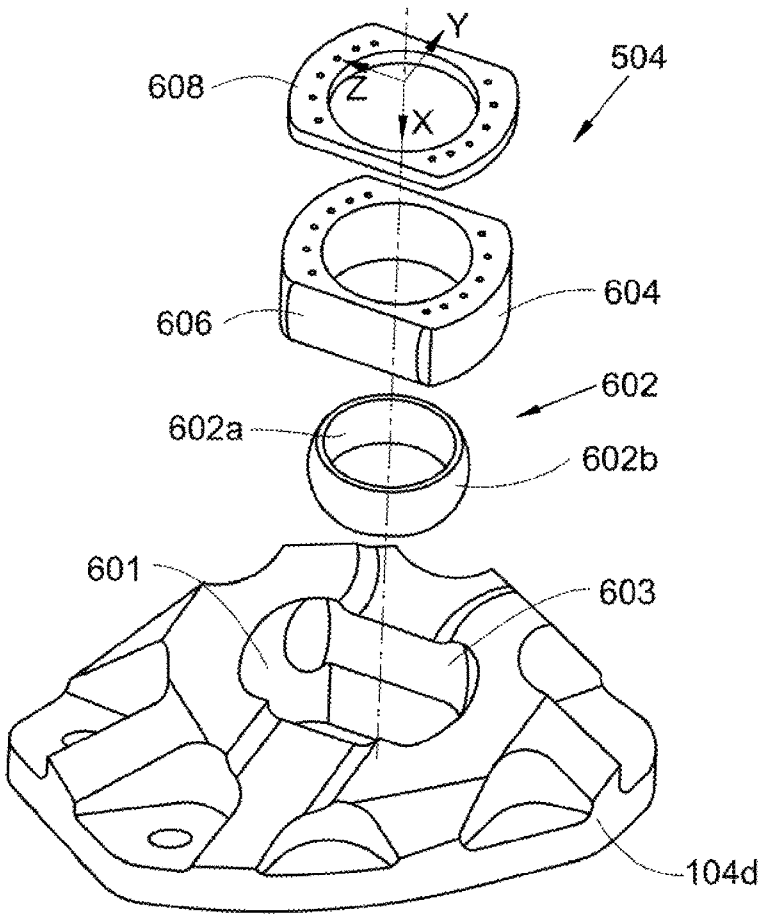
FIG. 6 is an exploded view of certain elements of the detail in FIG. 4.

FIGS. 4 to 6 show an embodiment of the connection between the stud 502 and the lower fitting 104*d*.

The assembly 1 has a ring 602, which is pierced by a central bore 602*a*, which is fitted onto the distal end of the stud 502 and wherein the stud 502 can move in translation in said central bore 602*a* parallel to the longitudinal direction X. Moreover, the ring 602 has an outer surface 602*b*, which is spherical.

The assembly 1 also has a nut 604, the inner surface of which is spherical and in which the ring 602 is housed. The ring 602 can thus move in rotation in the nut 604.

In this case, the assembly 1 also has a blocking plate 608, which is fastened to the nut 604, for example screw-fastened, and which blocks the nut 604 from rotating with respect to the lower fitting 104*d*.

The ring 602, the nut 604 and the blocking plate 608 are housed in the aperture 601 of the lower fitting 104*d*, which has a suitable shape.

In order to ensure the translation of the stud 502 parallel to a vertical direction Z, the nut 604 has, on its outer surface, two ribs 606, which are on either side of the nut 604 with respect to the vertical median plane XZ. Each rib 606 is parallel to the vertical direction Z and in this case takes the form of a portion of a cylinder.

On the edges of the aperture 601, the lower fitting 104*d* has, for each rib 606, a recess 603, which extends parallel to the vertical direction Z and in which said rib 606 is guided in translation.

For reasons of redundancy, the stud 502 in this case consists of two half-cylinders 502*a-b*, which are on either side of a plane XY perpendicular to the vertical direction Z. The two half-cylinders 502*a-b* are thus joined together along said plane XY and the proximal end of each half-cylinder 502*a-b* is fastened to the rear rib 268, in this case by means of a shoe 506*a-b* fastened, for example by threaded fastening elements, to the rear rib 268. Thus, in the event of either of the half-cylinders 502*a-b* breaking, the other takes over.

In order to keep the two half-cylinders 502*a-b* joined together, the distal end of the stud 502 is covered with a sleeve 508.

According to one particular embodiment, shown more particularly in FIG. 7, the lower fitting 104*d* consists of a lower port-side component 112*b*, a lower starboard-side component 112*a*, an upper port-side component 114*b* and an upper starboard-side component 114*a*. The lower components 112*a-b* are symmetrical to one another with respect to the vertical median plane XZ and are joined to one another along this vertical median plane XZ. In the same way, the upper components 114*a-b* are symmetrical to one another with respect to the vertical median plane XZ and are joined to one another along this median plane XZ.

The starboard-side components 112*a* and 114*a* are fastened to one another and the port-side components 112*b* and 114*b* are fastened to one another. Finally, the starboard-side components 112*a* and 114*a* and the port-side components 112*b* and 114*b* are fastened to one another along the vertical median plane XZ. All of these fastenings are provided by appropriate means such as threaded fastening elements.

In addition, each lower component 112*a-b* is fastened to the lateral panel 208*a-b* that is on the same side and each upper component 114*a-b* is fastened to the pressure-side panel 104*b*.

Thus, in the event of either of these components breaking, forces continue to be transferred through the other components.

In an embodiment that is not shown, the redundancy is reduced. The lower port-side component 112*b* and the upper port-side component 114*b* are one and the same component and form a port-side component and, in the same way, the lower starboard-side component 112*a* and the upper starboard-side component 114*a* are one and the same component and form a starboard-side component. The lower fitting 104*d* thus consists of the port-side component and the starboard-side component, which are symmetrical to one another with respect to the vertical median plane XZ and are joined to one another along this median plane XZ. The port-side and starboard-side components are fastened to one another along the vertical median plane XZ, and each component is fastened to the lateral panel 208*a-b* that is on the same side and to the pressure-side panel 104*b*.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft having a wing with a structure and a pressure-side panel, the assembly having a longitudinal direction and a vertical median plane and comprising:

an upper fitting configured to be fastened to the structure of the wing;

a lower fitting configured to be fastened to the pressure-side panel;

an engine pylon having a primary structure forming a box and having a starboard-side lateral panel, a port-side lateral panel, and a rear rib, wherein the rear rib closes the box at a rear, and wherein each lateral panel is mounted so as to articulate on the lower fitting;

a starboard-side link rod, a first end of the starboard-side link rod mounted so as to articulate on the starboard-side lateral panel and wherein a second end of the starboard-side link rod mounted so as to articulate on the upper fitting;

a port-side link rod, a first end of the port-side link rod mounted so as to articulate on the port-side lateral panel and wherein a second end of the port-side link rod mounted so as to articulate on the upper fitting; and a stud with an axis parallel to the longitudinal direction and having a proximal end secured to the rear rib and a distal end mounted in an aperture of the lower fitting through an annular linear connection.

2. The assembly according to claim 1, wherein the stud is configured to move in translation with respect to the lower fitting parallel to a vertical direction.

3. The assembly according to claim 2, further comprising:

a ring, which has a spherical outer surface and is fitted onto the distal end of the stud; and, a nut, which has a spherical inner surface in which the ring is housed, wherein, on either side of the nut, the spherical outer surface of the nut has a rib parallel to the vertical direction, wherein, on edges of the aperture, the lower fitting has, for the rib, a recess extending parallel to the vertical direction in which the rib is guided in translation.

4. The assembly according to claim 1, wherein the stud comprises two half-cylinders joined together along a plane, wherein a proximal end of each half-cylinder is fastened to the rear rib.

5. The assembly according to claim 1, wherein the second end of the port-side link rod and the second end of the starboard-side link rod are both mounted so as to articulate about a same articulation shaft.

6. The assembly according to claim 5, wherein said same articulation shaft comprises a peripheral shaft, which is cylindrical and hollow, and of an inner shaft, fitted into the peripheral shaft.

7. The assembly according to claim 1, wherein the lower fitting comprises a port-side component and a starboard-side component fastened to one another along the vertical median plane, wherein the port-side component is fastened to the port-side lateral panel and to the pressure-side panel, wherein the starboard-side component is fastened to the starboard-side lateral panel and to the pressure-side panel.

8. The assembly according to claim 1, wherein the lower fitting comprises a lower port-side component, a lower starboard-side component, an upper port-side component, and an upper starboard-side component, wherein the lower starboard-side component and the upper starboard-side component are fastened to one another and the upper starboard-side component is fastened to the pressure-side panel and the lower starboard-side component fastened to the starboard-side lateral panel, wherein the lower port-side component and the upper port-side component are fastened to one another and the upper port-side component is fastened to the pressure-side panel and the lower port-side component fastened to the port-side lateral panel, and, wherein the starboard-side components and the port-side components are fastened to one another along the vertical median plane.

9. An aircraft comprising:

a wing with a structure and a pressure-side panel;

a jet engine; and the assembly according to claim 1, wherein the upper fitting is fastened to the structure of the wing, wherein the lower fitting is fastened to the pressure-side panel, and wherein the jet engine is fastened beneath the engine pylon.

* * * * *